(12) United States Patent
Igawa

(10) Patent No.: US 6,196,585 B1
(45) Date of Patent: Mar. 6, 2001

(54) METHOD OF FOLDING AIRBAG FOR FRONT PASSENGER

(75) Inventor: Tadahiro Igawa, Echi-gun (JP)

(73) Assignee: Takata Corporation, Tokyo (JP)

( * ) Notice: Subject to any disclaimer, the term of this patent is extended or adjusted under 35 U.S.C. 154(b) by 0 days.

(21) Appl. No.: 09/301,614

(22) Filed: Apr. 29, 1999

(30) Foreign Application Priority Data

May 11, 1998 (JP) .................................................. 10-142062

(51) Int. Cl.[7] .................................................. B60R 21/20
(52) U.S. Cl. ..................... 280/743.1; 280/728.1; 280/730.1; 280/732
(58) Field of Search ............................ 280/728.1, 743.1, 280/732, 730.1

(56) References Cited

U.S. PATENT DOCUMENTS

| | | | | |
|---|---|---|---|---|
| 5,140,799 | * | 8/1992 | Satoh ........................................ | 53/429 |
| 5,178,407 | * | 1/1993 | Kelley ..................................... | 280/728 |
| 5,240,282 | * | 8/1993 | Wehner et al. ..................... | 280/728.1 |
| 5,290,061 | * | 3/1994 | Bollaert .............................. | 280/743.1 |
| 5,364,126 | * | 11/1994 | Kuretake et al. ................. | 280/730.1 |
| 5,382,048 | * | 1/1995 | Paxton et al. ........................ | 280/728 |
| 5,492,367 | * | 2/1996 | Albright et al. .................. | 280/743.1 |
| 5,520,408 | * | 5/1996 | Niederman ......................... | 280/728.1 |
| 5,531,477 | * | 7/1996 | Madrigal et al. ................. | 280/743.1 |
| 5,542,698 | * | 8/1996 | Ichino et al. ......................... | 280/732 |
| 5,613,698 | * | 3/1997 | Patercsak et al. ................ | 280/728.1 |
| 5,636,860 | * | 6/1997 | Fischer et al. .................... | 280/730.1 |
| 5,636,861 | * | 6/1997 | Orsulak et al. ................... | 280/730.1 |
| 5,884,939 | * | 3/1999 | Yamaji et al. ..................... | 280/743.1 |
| 5,957,486 | * | 9/1999 | Taguchi et al. ....................... | 280/729 |

FOREIGN PATENT DOCUMENTS

| | | |
|---|---|---|
| 0 997 352 | 5/2000 | (EP) . |
| 7-205750 | 8/1995 | (JP) . |
| 9-142249 | 6/1997 | (JP) . |
| 10-338096 | 12/1998 | (JP) . |

* cited by examiner

Primary Examiner—Brian L. Johnson
Assistant Examiner—Deanna Draper
(74) Attorney, Agent, or Firm—Kanesaka & Takeuchi

(57) ABSTRACT

In a passenger airbag, a loose portion is provided on a windshield side when an airbag is accommodated into an airbag case. In addition, a tip portion of the airbag is folded or rolled up on the counter-windshield side. As a result, a gas first flows into the loose portion during the deployment of the airbag. Therefore, the airbag starts to deploy from a part on the windshield side, and a portion of the airbag, which has already been inflated with its folded portion being unfolded, comes to contact with the windshield, thereby reducing the pressure applied onto the windshield. The airbag can provide suitable deployment to securely restrain an occupant, and is improved in smooth deployment. The air bag prevents undesirable pressure on the windshield without increasing the cost.

5 Claims, 5 Drawing Sheets

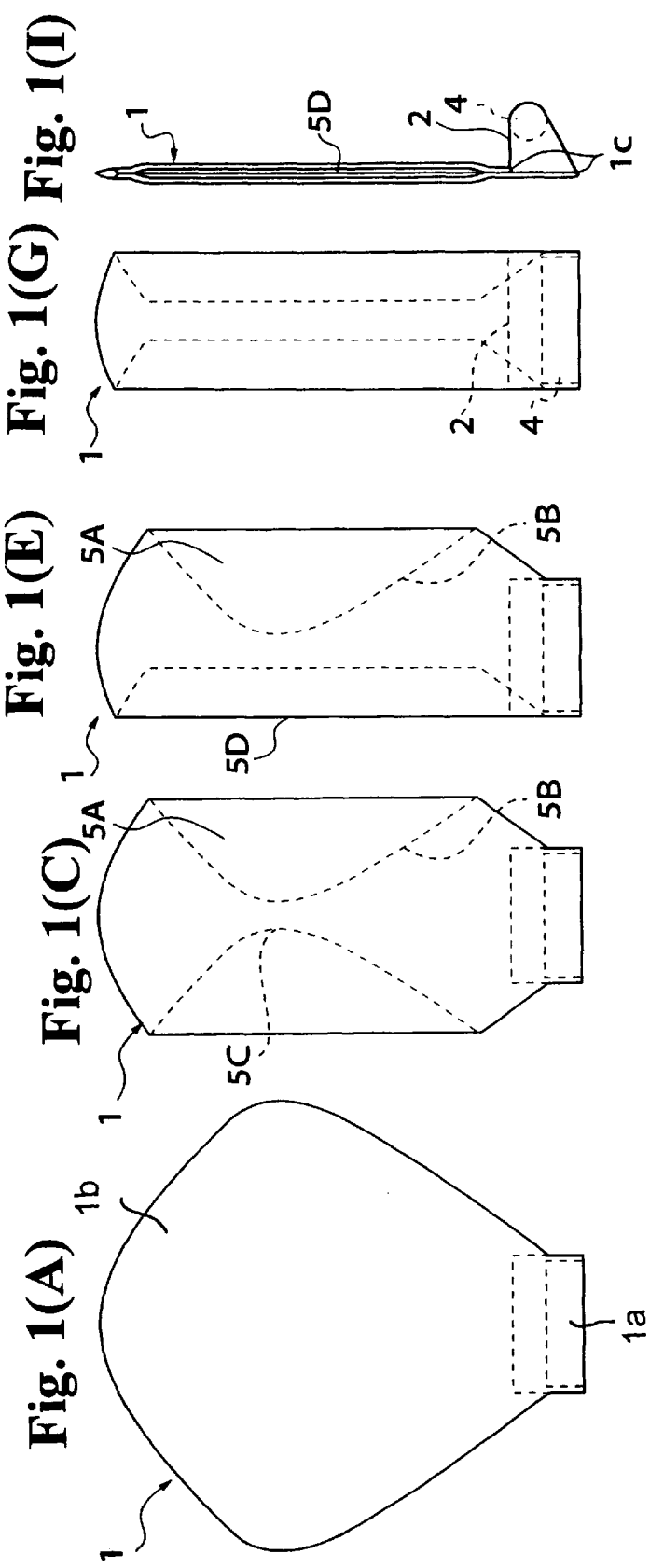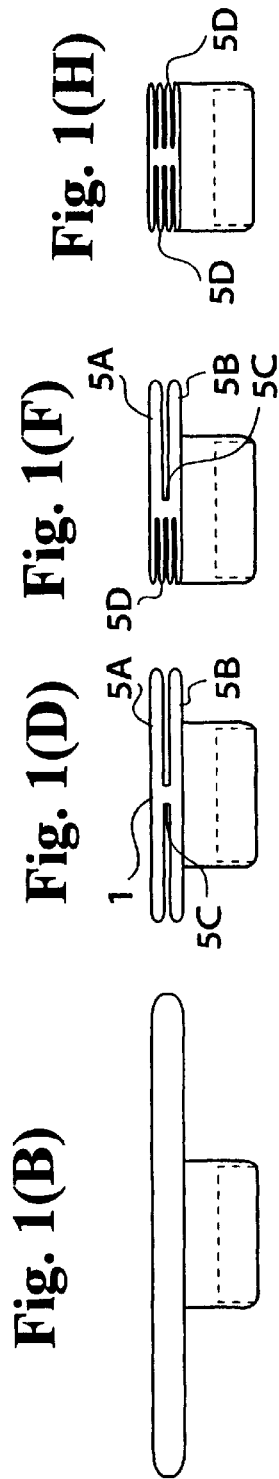

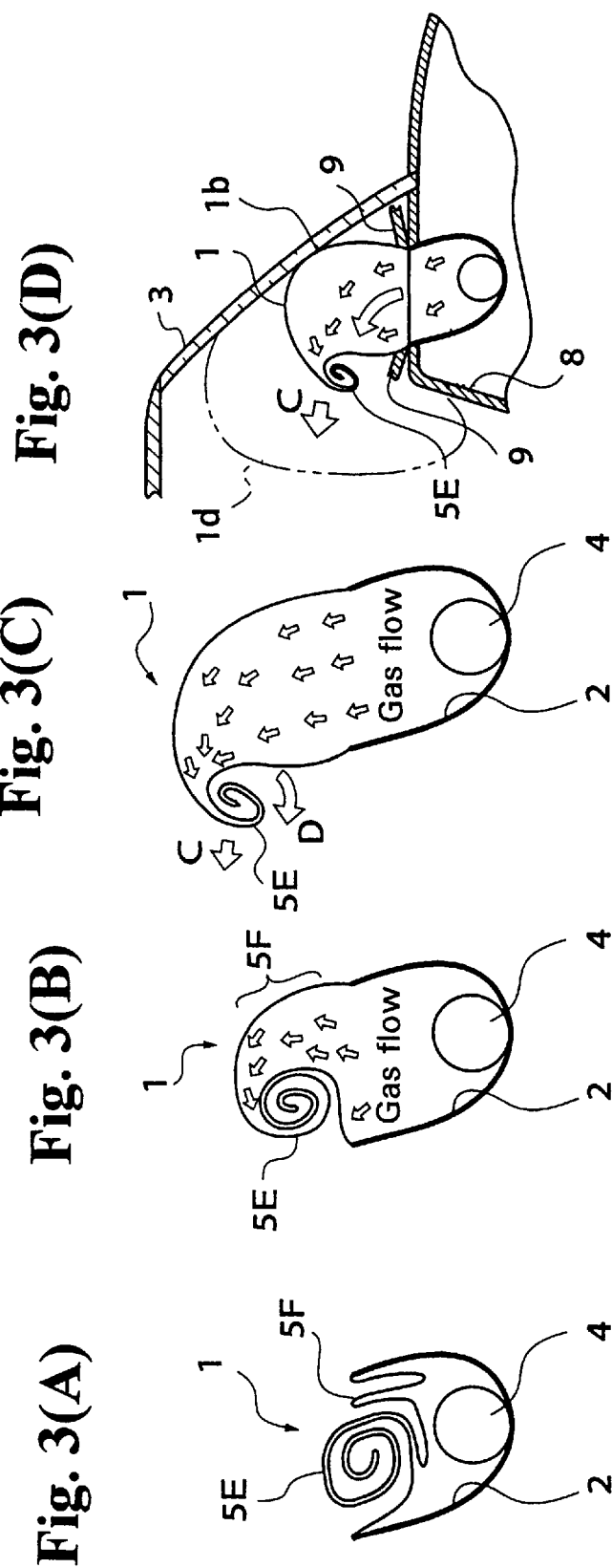

METHOD OF FOLDING AIRBAG FOR FRONT PASSENGER

BACKGROUND OF THE INVENTION AND RELATED ART STATEMENT

The present invention relates to a method of folding an airbag for a front passenger which is deployed to protect an occupant in the event of vehicle collision. More particularly, the airbag for protecting a front passenger, can accomplish suitable deployment for sufficiently restraining an occupant and is improved to deploy smoothly.

FIGS. 4(A), 4(B) and 4(C) are views showing an airbag for a front passenger (hereinafter, referred to as "passenger airbag" or "airbag") when it is deployed, which is folded in one of conventional folding methods. FIG. 4(A) is a side view for showing the passenger airbag 1 accommodated in an airbag case 2. In these figures, the right hand side is a windshield side and the left hand side is an occupant side or counter-windshield side.

In FIG. 4(A), right and left end portions or loose portions 5G, 5F of the airbag 1 are folded in bellows, and a tip portion or wound portion 5E is wound in such a manner that a windshield-side surface becomes the outer surface of the wound airbag. After that, the entire airbag 1 is accommodated in the airbag case 2. The airbag 1 is fixed to an inner surface of an opening of the airbag case 2 by fittings (not shown). The loose portions 5F, 5G are formed by folding in bellows at both windshield side and counter-windshield side. Inside the airbag case 2, an inflator 4 for generating a gas for deploying the airbag is disposed. The airbag case 2 is installed in an instrument panel 8 in FIG. 4(B) in front of the front passenger seat within a vehicle.

The passenger airbag as shown in FIG. 4(A) starts to deploy through an upper portion of the instrument panel and is inflated upward. The description will now be made as regard to the configurations of the passenger airbag, during its deployment where it is inflated upward, which is folded as shown in FIG. 4(A).

FIGS. 4(B) and 4(C) are views showing the configurations of the passenger airbag during its deployment which is folded in the conventional manner shown in FIG. 4(A). In FIG. 4(B), as the gas from the inflator 4 disposed in the airbag case 2 flows into the airbag 1 as shown by arrows, an airbag cover 9 attached to the instrument panel 8 is broken by the gas pressure in the airbag 1 and the airbag 1 is deployed above the instrument panel 8. At this point, the gas first flows into the loose portions 5F, 5G on the windshield side and the counter-windshield side, prior to the wound portion 5E of the airbag 1. That is, the airbag 1 is first deployed at the loose portions 5F, 5G and, after that, deployed at the wound portion 5E.

However, according to the passenger airbag which is folded in the conventional method as described above, the loose portions 5F, 5G are first deployed so that the wound portion 5E is pushed up by the deployed loose portions 5F, 5G. This means that the wound portion 5E is kept in the folded state during its upward movement.

The wound portion 5E is pushed upward (arrow A) while it is still in the folded state as shown in FIG. 4(C), so that the portion 5E strikes the windshield 3 in the wound state. With this deployment process of the airbag 1, there is a possibility that the windshield 3 is subjected to an undesirable local pressure. In order to prevent the application of the undesirable local pressure on the windshield 3, various measures have been taken, for example, reducing the output of the inflator 4, adjusting the mounting position of the airbag 1 and/or the angle for mounting the airbag case 2, and increasing the strength of the windshield 3. These measures limit the free designing of the airbag and the instrument panel and, in addition, increase the cost.

The present invention has been made in order to solve the above problem, and an object of the invention is to provide a passenger airbag, which can provide stable and smooth deployment to securely and sufficiently restrain an occupant.

Another object of the invention is to provide a passenger airbag as stated above, which prevents an undesirable local pressure from being applied on the windshield 3 without increasing the cost.

A further object of the invention is to provide a folding method of a passenger airbag as stated above.

Further objects and advantages of the invention will be apparent from the following description of the invention.

SUMMARY OF THE INVENTION

In order to solve the above-described problems, an airbag according to the first aspect of the present invention is deployed in front of a front passenger seat, wherein the airbag is folded to have a loose portion only on a windshield side when it is accommodated in an airbag case, whereby in the deployment of the airbag, a gas first flows into the loose portion, so that the windshield side is deployed prior to the counter-windshield side.

Further, an airbag according to the second aspect of the present invention is deployed in front of a front passenger seat, wherein the airbag is folded to have loose portions on both windshield side and counter-windshield side. The number of the loose portion on the windshield side is larger than that of the loose portion on the counter-windshield side, whereby in the deployment of airbag, a larger volume of a gas flows into the loose portion on the windshield side compared to that on the counter-windshield side so that the windshield side is deployed prior to the counter-windshield side.

Furthermore, an airbag according to the third aspect of the present invention is deployed in front of a front passenger seat, wherein the airbag is folded to have loose portions on both windshield side and counter-windshield side. The length of the loose portion on the windshield side is longer than that of the loose portion on the counter-windshield side, whereby in the deployment of airbag, a larger volume of a gas flows into the loose portion on the windshield side as compared to that on the counter-windshield side, and the windshield side is therefore deployed prior to the counter-windshield side.

In the airbag for a front passenger seat according to the first through third aspects of the present invention, the airbag starts to deploy at the windshield side and a portion of the airbag, which has already been inflated with its folded portion being unfolded, comes to contact the windshield, so that the force applied to the windshield is spread so as to reduce the pressure on the windshield.

In addition, an airbag according to the fourth aspect of the present invention is deployed in front of a front passenger seat, wherein the airbag is folded to have a loose portion only on the windshield side and to make a tip portion of the airbag to be folded or rolled up on the counter-windshield side when it is accommodated in an airbag case, whereby in the deployment of the airbag, a gas first flows into the loose portion, so that the windshield side is deployed prior to the counter-windshield side, and the tip portion is deployed toward an upper area of the counter-windshield side.

Further, an airbag according to the fifth aspect of the present invention is deployed in front of a front passenger seat, wherein the airbag is folded to have loose portions on both windshield side and counter-windshield side. The number of the loose portion on the windshield side is greater than that of the loose portion on the counter-windshield side, and a tip portion of the airbag is folded or rolled up on the counter-windshield side. Thus, in the deployment of the airbag, a larger volume of a gas flows into the loose portion on the windshield side as compared to that on the counter-windshield side, so that the windshield side is deployed prior to the counter-windshield side and the tip portion is deployed toward an upper area of the counter-windshield side.

Furthermore, an airbag according to the sixth aspect of the present invention is deployed in front of a front passenger seat, wherein the airbag is folded to have loose portions on both windshield side and counter-windshield side. The length of the loose portion on the windshield side is longer than that of the loose portion on the counter-windshield side, and a tip portion of the airbag is folded or rolled up on the counter-windshield side when it is accommodated in the airbag case. Thus, in the deployment of the airbag, a larger volume of a gas flows into the loose portion on the windshield side as compared to that on the counter-windshield side, so that the windshield side is deployed prior to the counter-windshield side and the tip portion is deployed toward an upper area of the counter-windshield side.

In the airbag for a front passenger seat according to the fourth through sixth aspects of the present invention, the tip portion of the airbag is folded or rolled up on the counter-windshield side, whereby the airbag starts to deploy at the windshield side and the rolled-up or folded portion of the airbag is prevented from being directly oriented toward the windshield during the deployment of the bag.

In the seventh aspect of the invention, an airbag is folded to be deployed in front of a front passenger seat, wherein only an end of the windshield side of the airbag is folded in bellows to have a loose portion.

In the eighth aspect of the invention, an airbag is folded to be deployed in front of a front passenger seat, wherein end portions of both windshield side and counter-windshield side of the airbag are folded in bellows to have loose portions on both end portions in such a manner that the number of the loose portion on the windshield side is greater than that of the loose portion on the counter-windshield side.

In the ninth aspect of the present invention, an airbag is folded to be deployed in front of a front passenger seat, wherein end portions of both windshield side and counter-windshield side of the airbag are folded in bellows to have loose portions in such a manner that the length of the loose portion on the windshield side is longer than that of the loose portion on the counter-windshield side. At this point, the length of the loose portion on the windshield side is preferably longer twice or more than that of the loose portion on the counter-windshield side.

In the folding method of the airbag for a front passenger seat according to the seventh through ninth aspects of the present invention, the airbag starts to deploy at the windshield side, and a portion of the airbag, which has already been inflated with its folded portion unfolded, comes to contact the windshield. Thus, the force applied to the windshield is spread so as to reduce the pressure on the windshield.

In the tenth aspect of the present invention, an airbag is folded to be deployed in front of a front passenger seat, wherein only an end of the windshield side of the airbag is folded in bellows to have a loose portion, and a tip of the airbag is folded or rolled on the counter-windshield side, which is then accommodated in an airbag case.

In the eleventh aspect of the present invention, an airbag is folded to be deployed in front of a front passenger seat, wherein end portions of both windshield side and counter-windshield side of the airbag are folded in bellows to have loose portions in such a manner that the number of the loose portion on the windshield side is greater than that of the loose portion on the counter-windshield side, and a tip portion of the airbag is folded or rolled on the counter-windshield side, which is then accommodated in an airbag case.

In the twelfth aspect of the present invention, an airbag is folded to be deployed in front of a front passenger seat, wherein end portions of both windshield side and counter-windshield side of the airbag are folded in bellows to have loose portion, in such a manner that the length of the loose portion on the windshield side is longer than that of the loose portion on the counter-windshield side, and a tip portion of the airbag is folded or rolled on the counter-windshield side, which is then accommodated in an airbag case. At this point, the length of the loose portion on the windshield side is preferably longer twice or more than that of the loose portion on the counter-windshield side.

In the folding method of the airbag for a front passenger seat according to the tenth through twelfth aspects of the present invention, the tip portion of the airbag is folded or rolled up on the counter-windshield side. Thus, the airbag starts to deploy at the windshield side, and the rolled-up or folded portion of the airbag is prevented from being directly oriented toward the windshield during the deployment of the airbag.

BRIEF DESCRIPTION OF THE DRAWINGS

FIGS. 1(A)–1(K) are views illustrating a folding process according to a folding method of an airbag of the present invention;

FIGS. 3(A)–3(D) are views showing the configurations of the airbag shown in FIGS. 2(A)–2(D) during its deployment.

DETAILED DESCRIPTION OF PREFERRED EMBODIMENTS

Hereinafter, the present invention will be described with reference to attached drawings.

Figure 1K:
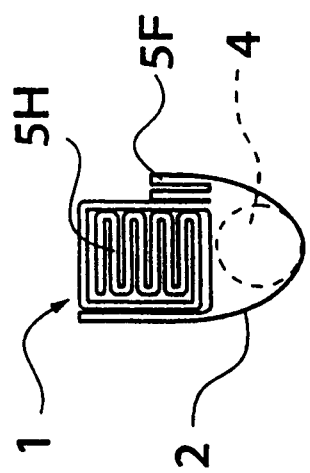

FIGS. 1(A)–1(K) are views illustrating the process of folding a passenger airbag according to one embodiment of the present invention. FIG. 1a is a plan view of the airbag 1 taken from the upper side and FIG. 1b is a front view of the airbag 1 taken from a side confronting a windshield. In these drawings, the airbag 1 is not folded yet and spreads, wherein an airbag opening 1a is located at one side and a tip 1b is located at the opposite side thereof.

FIGS. 1(C) and 1(D) illustrate a first stage of the folding process. FIG. 1(C) is a plan view of the airbag 1 taken from the upper side and FIG. 1(D) is a front view of the airbag 1 taken from the side confronting the windshield. In the first stage of the folding process, a portion of the airbag 1 about the center thereof is picked up and both side edges are put inside toward the center of the airbag 1 to form edge portions 5A and 5B which are overlaid on each other. Formed between the respective edge portions 5A and 5B are concavities 5C. At this point, the width of the edge portions 5A is nearly equal to the width of the edge portions 5B.

FIGS. 1(E) and 1(F) illustrate the second stage of the folding process, wherein FIG. 1(E) is a plan view of the airbag 1 taken from the upper side and FIG. 1(F) is a front view of the airbag 1 taken from the side confronting the windshield. As shown in FIGS. 1(E) and 1(F), in the second stage of the folding process, the left hand side doubled edges including the left edge portions 5A, 5B and concavity 5C are folded in such a manner that the edge portions 5A, 5B are each further doubled by folding to form bellows or flaps 5D on the left hand side of the airbag 1.

FIGS. 1(G), 1(H) and 1(I) illustrate the third stage of the folding process, wherein FIG. 1(G) is a plan view of the airbag 1 taken from the upper side, FIG. 1(H) is a front view of the airbag 1 taken from the side confronting the windshield, and FIG. 1(I) is a side view of the airbag 1 taken from the lateral side. In the third stage of the folding process, in the same manner as in the second stage shown in FIGS. 1(E) and 1(F), the right hand side doubled edges including the right edge portions 5A, 5B and concavity 5C are folded in such a manner that the edge portions 5A, 5B are each further doubled by folding to form bellows or flaps 5D on the right hand side of the airbag 1. In this manner, as shown in FIG. 1(H), the bellows 5D are formed on the right and left hand sides of the airbag 1. A base 1c of the airbag 1 around an opening is connected and fixed to the airbag case 2 as shown in FIG. 1(I). At this point, the width formed by the bellows 5D is equal to or smaller than the width of the airbag case 2. Arranged within the airbag case 2 is an inflator 4 for generating a gas for deploying the airbag.

Figure 1J:
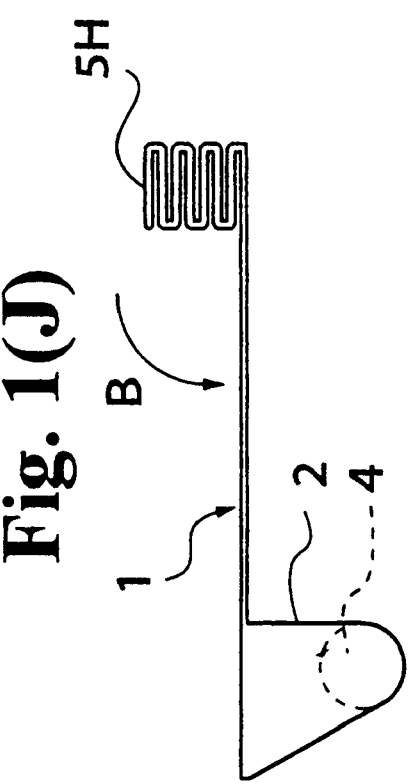

FIG. 1(J) is a side view of the airbag 1 taken from the lateral side, illustrating the fourth stage of the folding process. The right hand side of FIG. 1(J) is the windshield side. As shown in FIG. 1(J), in the fourth stage of the folding process, a tip portion of the airbag 1 is folded several times to form bellows 5H on the upper side of the airbag 1. The bellows 5H are rolled up in the direction of arrow B (counter-clockwise direction) and the airbag 1 is thus accommodated in the airbag case 2.

FIG. 1(K) is a side view of the airbag 1 taken from the lateral side, illustrating the final stage of the folding process. The bellows 5H as shown in FIG. 1(J) are rolled up in the direction of an arrow B (counterclockwise direction), and the airbag 1 is accommodated in the airbag case 2. The airbag 1 is fixed to the inside of an opening of the airbag case 2 by fittings (not shown). The fittings not only fix the airbag 1, but also seal the inside of the airbag 1 and the inside of the airbag case 2. When the airbag 1 is accommodated in the airbag case 2, a loose portion 5F in the form of bellows is formed only on the windshield side (right hand side of the drawing) of the bellows 5H of the airbag 1.

Hereinafter, variations of the folding method according to the embodiment of FIGS. 1(A)–(K) will be described.

Figure 2A:
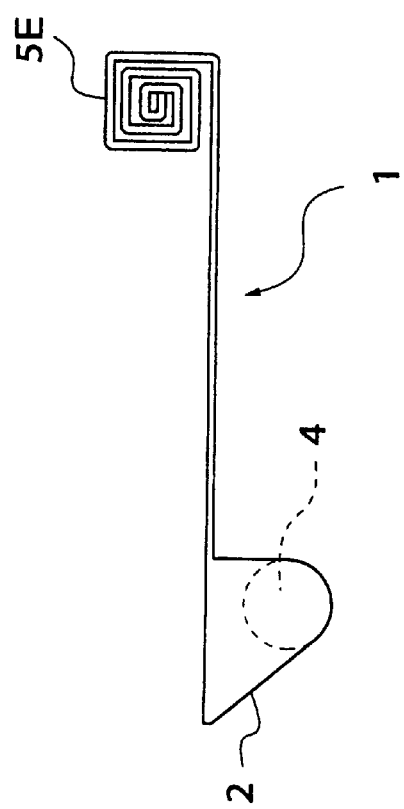
FIGS. 2(A)–2(D) are views showing variations of the folding method shown in FIGS. 1(A)–1(K)
Figure 2B:
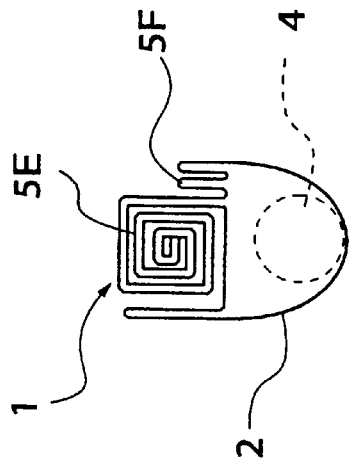

FIGS. 2(A)–2(D) show the fourth stage corresponding to FIG. 1(J) and the final stage corresponding to FIG. 1(K) as variations of the folding method of FIGS. 1(A)–1(K). It should be noted that in the folding methods shown in FIGS. 2(A)–2(D), the processes prior to the fourth stage are the same as those shown in FIGS. 1(A)–1(I). In the fourth stage of the folding process, as shown in FIG. 2(A), the tip portion of the airbag 1 is rolled up to form a rolled-up portion 5E in such a manner that a surface of the airbag at the windshield side becomes the outer surface of the rolled-up portion. Then, in the final stage of the folding process, as shown in FIG. 2(B), the rolled-up portion 5E of the airbag 1 is accommodated in the airbag case 2. At this point, a loose portion 5F is formed only on the windshield side (right hand side) of the rolled-up portion 5E of the airbag 1.

Figure 2C:
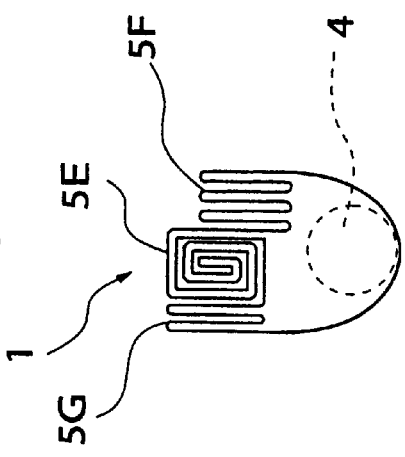
Figure 2D:
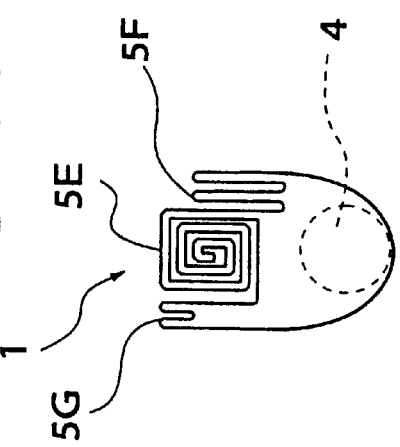
Figure 4C:
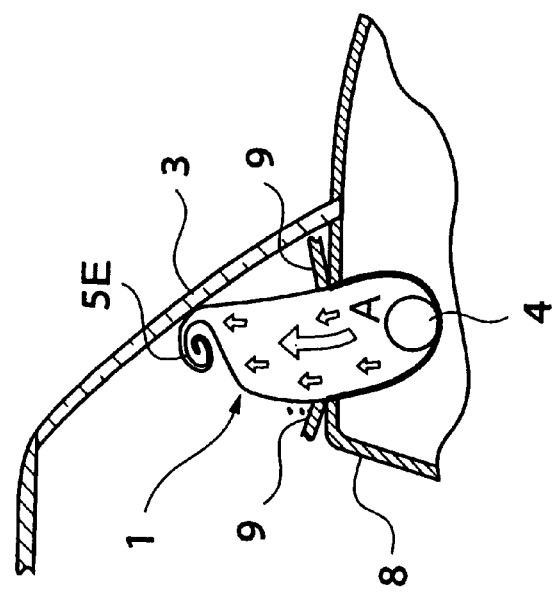
FIGS. 4(A)–4(C) are views showing the configurations of the passenger airbag, during its deployment, which is folded in the conventional method.
Figure 4B:
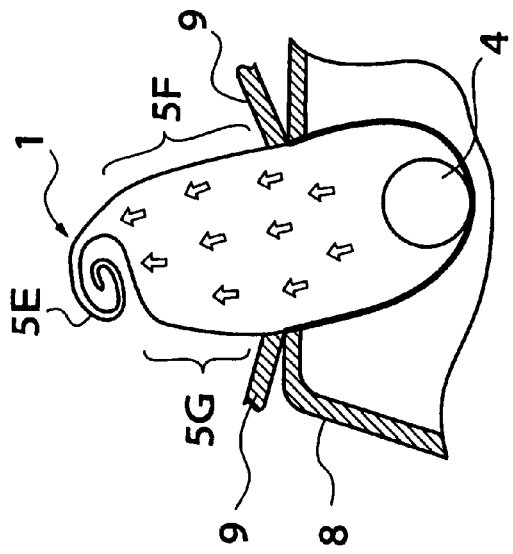
Figure 4A:
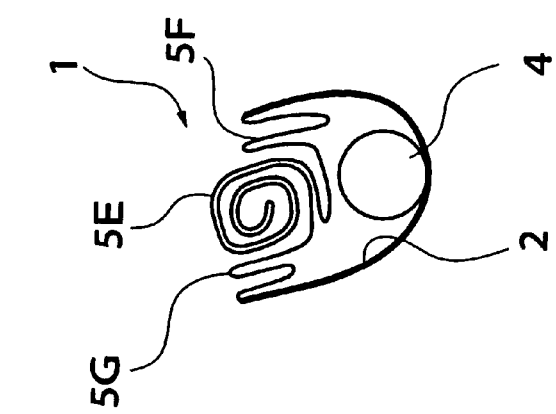

FIGS. 2(C) and 2(D) show other variations of FIG. 2(B). As shown in FIGS. 2(C) and 2(D), the loose portions 5F, 5G in the form of bellows may be formed on both the windshield side and the counter-windshield side. In this case, as shown in FIG. 2(C), the number of folds of the loose portion 5F on the windshield side should be greater than that of folds of the loose portion 5G on the counter-windshield side, or as shown in FIG. 2(D), the length of folds of the loose portion 5F on the windshield side should be longer than that of folds of the loose portion 5G on the counterwindshield side. In case that the adjustment is made with the length of the loose portion as shown in FIG. 2(D), the length of the loose portion 5F on the windshield side is preferably twice or more longer than the loose portion 5G on the counter-windshield side.

The description will now be made as regard to the configurations of the passenger airbag, during its deployment, which is folded as mentioned above.

FIGS. 3(A)–3(D) are side views of the airbag 1 during its deployment taken from the lateral side illustrating the configurations of the passenger airbag as shown in FIG. 2(B). FIG. 3(A) shows the state before the deployment. As the gas flows from the inflator 4 installed in the airbag case 2 into the airbag 1, the airbag 1 starts to deploy with the pressure of the gas as shown in FIG. 3(B). The gas is likely to flow into the loose portion 5F on the windshield side because of the lower fluid resistance than that of the rolled-up portion 5E of the airbag 1 shown in FIG. 3(A). Therefore, as shown in FIG. 3(B), the airbag 1 starts to deploy at the loose portion 5F on the windshield side first.

On the other hand, the gas has not yet entered the rolled-up portion or core 5E of the tip portion of the airbag 1. There is no loose portion on the counter-windshield side, so that the gas flows into the windshield side earlier than the counter-windshield side. As shown in FIG. 3(C), the rolled-up portion 5E is deployed with unfolding its roll toward a portion above the counter-windshield side (shown by arrows C and D). It should be noted that, if the tip portion of the airbag 1 is rolled up in the direction opposite to that shown in FIG. 2(A) to form a rolled-up portion, the rolledup portion 5E is deployed with unfolding its roll toward the windshield, so it is not preferable.

FIG. 3(D) shows the airbag 1 which is advanced in its deployment and also shows the fully deployed airbag. In FIG. 3(D), the airbag 1 shown by a solid line is in the state immediately before the completion of its deployment, and the airbag 1d shown by a chain double-dashed line is in the fully deployed state. The deployment of the airbag 1 is not directed to the upper windshield 3, and is directed to an upper area of the counter-windshield side (arrow C). Therefore, the rolled-up portion 5E is prevented from directly striking the windshield 3. A contact portion 1b of the airbag 1 which comes to contact with the windshield 3 has already been inflated with its folded portion being unfolded before the contact with the windshield 3. Since the force applied to the windshield 3 by the airbag 1 is therefore spread so as to reduce the pressure on the windshield 3 and the direct strike by the rolled-up portion or core 5E is prevented, the undesirable local pressure on the windshield 3 can be avoided.

As stated above, according to the passenger airbag and the folding method thereof of this embodiment, the loose portion 5F is provided only on the windshield side when the airbag 1 is accommodated in the airbag case 2. As a result, the gas first flows into the loose portion 5F during the deployment of the airbag 1. Therefore, the airbag starts to deploy from a part on the windshield side, and the contact portion 1b of the airbag 1, which has already been inflated with its folded portion being unfolded, comes to contact with the windshield 3. Thus, the force applied to the windshield 3 is spread so as to reduce the pressure on the windshield 3.

Since the tip portion of the airbag 1 is folded or rolled up on the counter-windshield side, the rolled-up portion 5E or the bellows 5H of the airbag is prevented from being directed toward the windshield 3 during the deployment of the airbag 1.

The application of undesirable local pressure on the windshield 3 by the airbag 1 can be prevented, thereby relieving measures which have been taken, for example, reducing the output of the inflator, adjusting the mount position of the airbag and/or the angle for mounting the airbag case, and increasing the strength of the windshield.

As apparent from the above description, the present invention can provide a passenger airbag which can provide suitable deployment to securely restrain an occupant, which is improved in smooth deployment, and which prevents undesirable pressure from being applied on a glass without increasing the cost, and also can provide a folding method of the airbag used therefor.

While the invention has been explained with reference to the specific embodiments of the invention, the explanation is illustrative and the invention is limited only by the appended claims.

What is claimed is:

1. A folding method of an airbag to be deployed in front of a front passenger seat, comprising:
    placing the airbag so that an airbag opening is located at one side and a tip of the airbag is located at the other side,
    folding two lateral sides of the airbag inwardly to form flaps between upper and lower portions of the airbag, said flaps extending in a longitudinal direction of the airbag,
    folding said upper and lower portions with the flaps therebetween such that the tip of the airbag is located inside and a windshield side portion of the airbag faces outwardly to thereby form a loose portion at the windshield side portion near the airbag opening,
    folding the loose portion of the airbag in bellows,
    folding a counter-windshield side portion of the airbag in bellows to form a loose portion, the length of the loose portion in the windshield side portion being greater than that of the loose portion in the counter-windshield side portion, and
    disposing the folded upper and lower portions and the loose portions in bellows in an airbag case so that upon inflation of the airbag, a gas first flows into the loose portion of the windshield side portion to be deployed prior to the counter-windshield side portion.

2. A folding method of an airbag according to claim 1, wherein an airbag in bellows to form a loose portion, a number of the bellows in the windshield side portion is greater than that of the bellows in the counter-windshield side portion.

3. A folding method of an airbag according to claim 1, wherein the length of the loose portion at the windshield side portion is at least twice longer than that of the loose portion at the counter-windshield side portion.

4. A folding method of an airbag according to claim 1, wherein said flaps extending direction of the airbag so that the flaps on one side do not overlap the flaps on the other side.

5. A folding method of an airbag to be deployed in front of a front passenger seat, comprising:
    placing the airbag so that an airbag opening is located at one side and a tip of the airbag is located at the other side,
    folding two lateral sides of the airbag inwardly to form flaps between upper and lower portions of the airbag, said flaps extending in a longitudinal direction of the airbag,
    folding said upper and lower portions with the flaps therebetween such that the tip of the airbag is located inside and a windshield side portion of the airbag faces outwardly to thereby form a loose portion at the windshield side Portion near the airbag opening,
    folding the loose portion of the airbag in bellows, and
    disposing the folded upper and lower portions and the loose portion in bellows in an airbag case so that upon inflation of the airbag, a gas first flows into the loose portion to allow the windshield side portion to be deployed prior to a counter-windshield side portion, a part of the airbag first abuts against the windshield, and then, the windshield side portion of the airbag is deployed along the windshield and at a same time the tip portion is deployed toward an upper area of the counter-windshield side portion.

* * * * *